United States Patent
Agrawal et al.

(10) Patent No.: US 11,620,794 B2
(45) Date of Patent: Apr. 4, 2023

(54) DETERMINING VISUALLY REFLECTIVE PROPERTIES OF PHYSICAL SURFACES IN A MIXED REALITY ENVIRONMENT

(71) Applicant: Intel Corporation, Santa Clara, CA (US)

(72) Inventors: Ankur Agrawal, Portland, OR (US); Glen J. Anderson, Beaverton, OR (US); Meng Shi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/221,079

(22) Filed: Dec. 14, 2018

(65) Prior Publication Data

US 2019/0122441 A1  Apr. 25, 2019

(51) Int. Cl.
*G06T 19/00* (2011.01)
*G06T 15/50* (2011.01)
(Continued)

(52) U.S. Cl.
CPC ............ *G06T 19/006* (2013.01); *G03B 21/00* (2013.01); *G06F 3/011* (2013.01); *G06K 9/6263* (2013.01);
(Continued)

(58) Field of Classification Search
CPC ..... G06T 19/006; G06T 15/04; G06T 15/506; G06T 2215/16; G03B 21/00; G06F 3/011; G06K 9/00671; G06K 9/6263; G06K 9/2054; H04N 9/3194; H04N 9/3179; G06V 20/20
See application file for complete search history.

(56) References Cited

U.S. PATENT DOCUMENTS 8,872,853 B2   10/2014   Sugden et al.
9,652,892 B2    5/2017   Tomlin et al.
(Continued)

FOREIGN PATENT DOCUMENTS

BR    102015025808 A2 *  8/2017
WO    WO2015015479 A1     2/2015

OTHER PUBLICATIONS

Peebler, Bradley et al., U.S. Appl. No. 62/723,180 (Year: 2018).*
(Continued)

*Primary Examiner* — Chante E Harrison
(74) *Attorney, Agent, or Firm* — Schwabe, Williamson & Wyatt, P.C.

(57) ABSTRACT

The present disclosure is directed to systems, apparatuses, and processes to identify one or more physical surfaces within a mixed reality environment, determine visually reflective properties, respectively, of the one or more physical surfaces, and based upon the determined visually reflective properties, determined for an image to be projected out location in the mixed reality environment, characteristics of a reflection of the image in one of the one or more physical surfaces. Subsequent projections of the image in the location of the mixed reality environment may take into consideration the characteristics determined. Other embodiments may recommend or edit the image to be projected to optimize reflections of the image within the mixed reality environment. Other embodiments may be disclosed and/or claimed.

25 Claims, 9 Drawing Sheets

(51) Int. Cl.
*G03B 21/00* (2006.01)
*G06V 20/20* (2022.01)
*G06F 3/01* (2006.01)
*G06T 15/04* (2011.01)
*G06K 9/62* (2022.01)

(52) U.S. Cl.
CPC ............ *G06T 15/04* (2013.01); *G06T 15/506* (2013.01); *G06V 20/20* (2022.01); *G06T 2215/16* (2013.01)

(56) References Cited

U.S. PATENT DOCUMENTS

| | | | |
|---|---|---|---|
| 9,734,633 B2 | 8/2017 | Bennett et al. | |
| 10,559,121 B1* | 2/2020 | Moudgil | G06T 15/50 |
| 2012/0135783 A1* | 5/2012 | Sams | G06T 15/60 |
| | | | 455/556.1 |
| 2014/0333899 A1* | 11/2014 | Smithwick | G03B 21/00 |
| | | | 353/10 |
| 2017/0084075 A1* | 3/2017 | Robert | G06T 19/006 |
| 2018/0101991 A1* | 4/2018 | Dorner | G06T 7/70 |
| 2018/0247393 A1* | 8/2018 | Ohga | H04N 5/23293 |
| 2018/0374276 A1* | 12/2018 | Powers | G06T 19/20 |
| 2019/0122441 A1* | 4/2019 | Agrawal | G06K 9/00671 |
| 2019/0228568 A1* | 7/2019 | Wu | G06T 15/205 |
| 2019/0259201 A1* | 8/2019 | Duca | G06F 3/147 |
| 2019/0259205 A1* | 8/2019 | Nissinen | G06F 3/005 |
| 2019/0340810 A1* | 11/2019 | Sunkavalli | G06T 15/506 |
| 2019/0362539 A1* | 11/2019 | Kurz | G06T 19/006 |
| 2019/0371028 A1* | 12/2019 | Harrises | G06T 11/60 |
| 2019/0371279 A1* | 12/2019 | Mak | G09G 5/373 |
| 2020/0041261 A1* | 2/2020 | Bernstein | A61B 1/00167 |
| 2020/0066025 A1* | 2/2020 | Peebler | G06T 7/11 |
| 2020/0066042 A1* | 2/2020 | Marsh | H04L 63/00 |

OTHER PUBLICATIONS

Timo Ropinski et al., "Virtual Reflections for Augmented Reality Environments", p. 1-8 (Year: 2004).*
Charles E. Hughes et al., "Real-time Illumination and Shadowing by Virtual Lights in a Mixed Reality Setting", Jun. 4, 2014, 10 pages, https://www.researchgate.net/publication/228610763_Real_time_illumination_and_shadowing_by_virtual_lights_in_a_mixed_reality_setting.

* cited by examiner

700 — NON-TRANSITORY COMPUTER-READABLE STORAGE MEDIUM 702 AS MAY BE IMPLEMENTED IN EMBODIMENTS OF FIGS. 4 OR 5

PROGRAMMING INSTRUCTIONS 704 TO CAUSE A COMPUTER DEVICE, IN RESPONSE TO EXECUTION OF THE INSTRUCTIONS BY A PROCESSOR OF THE COMPUTER DEVICE, TO PRACTICE ASPECTS OF EMBODIMENTS OF THE PROCESSES RELATED TO FIGS. 1-5.

DETERMINING VISUALLY REFLECTIVE PROPERTIES OF PHYSICAL SURFACES IN A MIXED REALITY ENVIRONMENT

FIELD

Embodiments of the present disclosure generally relate to the field of augmented reality (AR). More specifically, embodiments of the present disclosure relate to determining visually reflective properties of physical surfaces within an AR environment.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

AR may include a direct or indirect live view of a physical, real-world environment with elements that may be "augmented" by computer-generated perceptual information. This may occur across multiple sensory modalities, including visual, auditory, haptic, somatosensory, olfactory, and the like. This type of environment may also be referred to as a mixed reality environment.

AR may bring components of the digital world into an AR user's perception of the real world through the integration of immersive sensations that are perceived as natural parts of an environment. For example, AR may allow projections of virtual representations in a mixed reality environment.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
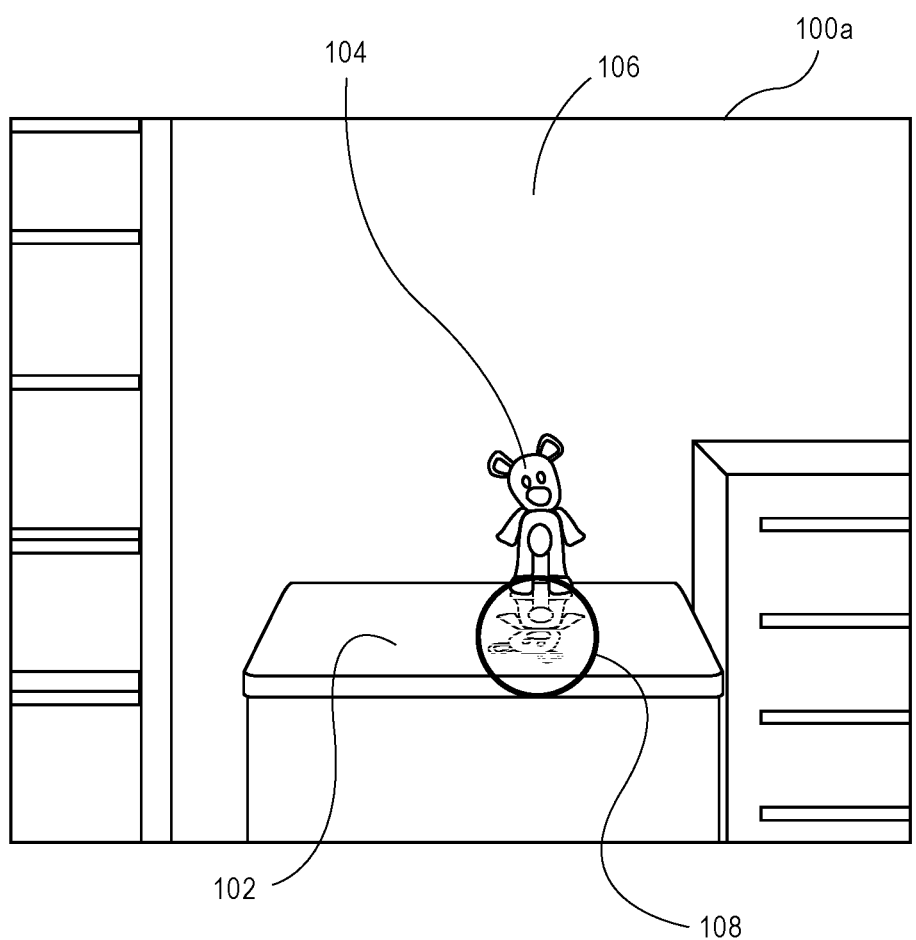
FIGS. 1A-1C illustrate aspects of reflections on physical surfaces made by a projected image in a mixed reality environment, in accordance with various embodiments.

This disclosure includes systems, processes, and apparatuses for enhancing the user experience in an AR environment, which may also be referred to as a mixed reality environment. Some embodiments include determining visually reflective properties of one or more physical surfaces in a mixed reality environment, and determining, based upon the visually reflective properties, characteristics of a reflection of an image projected in a location of the mixed reality environment. In embodiments, based upon the visually reflective properties, alterations to the projected image or alterations to the location on which the image is to be projected within the AR environment are made to enhance the resulting reflections.

Visual reflections of virtual objects or characters projected onto various physical surfaces contribute to the object or character as appearing real and present and in the same spatial dimension as an observer. Some embodiments described herein are directed to reflections on physical surfaces resulting from a projection-based image within an AR environment. For example, a projection of a virtual character on a wall of an AR environment causes the virtual character to appear to be walking on a physical surface, where surrounding physical surfaces reflect the projection of the virtual character. This adds another dimension to the realism of the projected virtual character and the virtual character's movements. As a result, the AR viewing experience may be made more believable and more connected to the physical aspect of the AR environment.

Some embodiments described herein are directed to identifying characteristics of physical surfaces. These characteristics are used to enhance the AR environment content, for example by determining how an image might be modified prior to projection or how the location onto which the image may be projected may be changed to optimize the reflective experience of the projected image within in the AR environment.

Legacy implementations of introducing virtual objects or characters into an AR environment may have included creating shadows or projecting a reflection of the objects or characters virtually, and then projecting the resulting creation into the AR environment to show realism. These legacy implementations differ from disclosures herein, where under the present disclosure, characteristics of physical surfaces in an AR environment may be calculated first, and then images of the various virtual objects or characters may be analyzed and then altered such that the actual reflection of the projected image seen in the various physical surfaces may be optimized, for example, but not limited to, color or brightness of the resulting reflections.

Some embodiments include scanning the physical AR environment and calculating the reflective properties of the physical surfaces within the environment. Some embodiments include determining the reflective properties or reflective index of the physical surfaces that are adjacent to the physical surface on which the image is projected. In embodiments, the reflective properties of the actual physical surfaces are calculated without direct human intervention. In embodiments, recommendations are made to a user to create and/or alter content to be projected in the AR environment based on the AR environment's reflective physical properties. As a result, a user's ability to determine the most desired image projection composition without having to resort to trial and error is greatly enhanced. In embodiments, the physical AR environment is scanned frequently and scanned from different points of view within the AR environment to re-calculate reflection models of the physical surfaces within the AR environment.

Some embodiments include a reflection analysis module for an AR environment that uses visual projection on physical surfaces of the AR environment to create an illusion of a presence of a virtual object or virtual character in the AR environment. In embodiments, the reflection analysis module evaluates reflective properties of physical surfaces adjacent to the projection surfaces, and predicts how a physical surface may reflect when the object or character is projected.

As a result of implementing one or more embodiments described herein, people engaged in an AR experience may have a richer and more realistic experience where virtual characters and objects exist in the environment of the people experiencing it. This may create more engaging and realistic experiences anchored in the physical environment by bringing the experience to the world of people rather than taking people into the world of the virtual.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

The term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The term "computer-readable storage media" may refer to, be a part of, or otherwise include media on which data, including instructions of a module that may be executed, may reside. Computer-readable storage media may be either transitory, or non-transitory.

Various operations may be described herein as multiple discrete operations in turn, in a manner that is most helpful in understanding the claimed subject matter. However, the order of description should not be construed as to imply that these operations are necessarily order dependent.

Figure 1B:
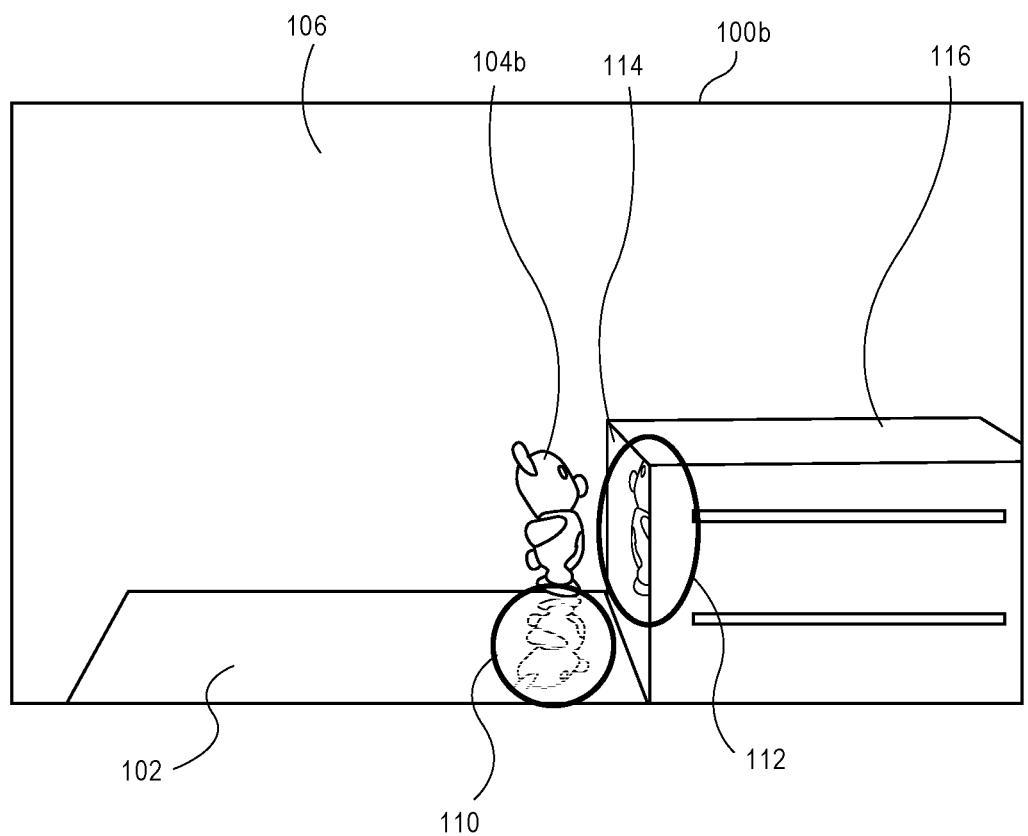
Figure 1C:
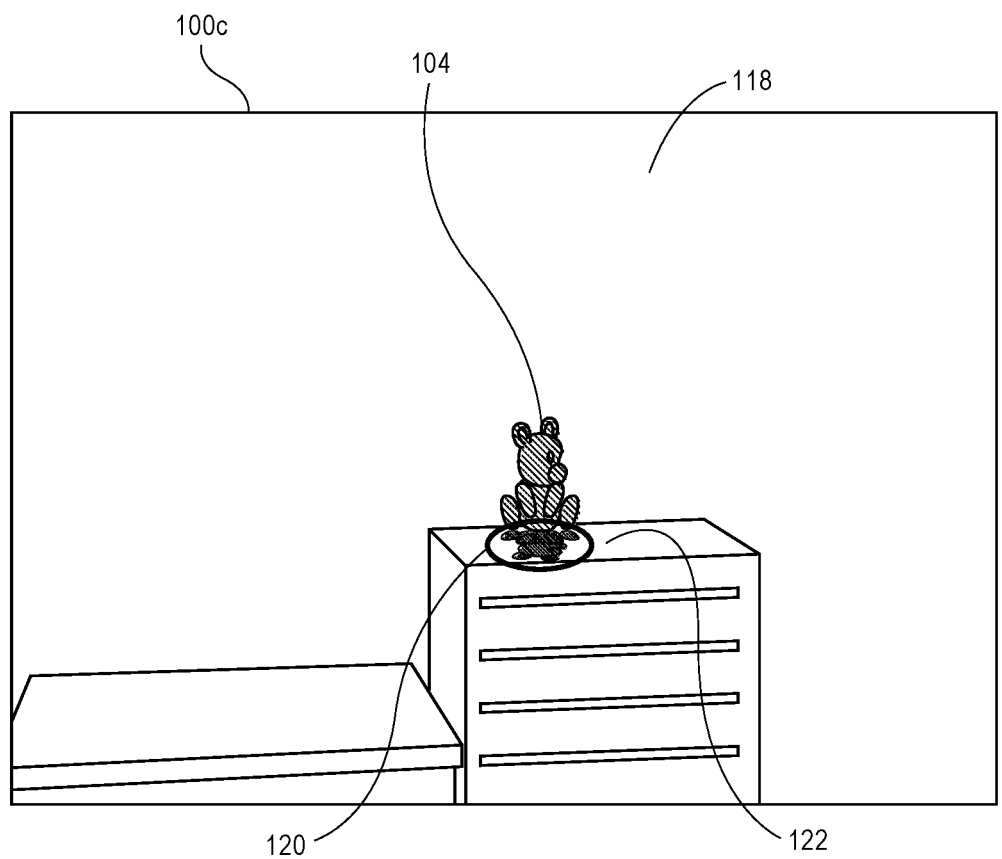

FIGS. 1A-1C illustrate aspects of reflections on physical surfaces made by a projected image in a mixed reality environment, in accordance with various embodiments. FIG. 1A shows an AR environment 100a that includes a first physical surface 102, which may be a tabletop. An image of an object 104, which may be a cartoon bear, is projected on a second physical surface 106, which may be a wall. In embodiments, the image of the object 104 may be a video of a cartoon bear. As a result of the projection of the image of the object 104, a reflection 108 of the projected image of the object 104 may be seen on the first physical surface 102. As will be described in more detail below, under the present disclosure, properties of first and/or second surfaces 102 and 106 are analyzed, and the reflection 108 results taking into consideration these properties. Resultantly, user experience may be enhanced.

FIG. 1B shows an AR environment 100b, which may be similar to AR environment 100a, shows another image of the object 104b, which may be similar to but in a different orientation as image of the object 104 of FIG. 1, projected onto the second surface 106, which may be a wall. A result of the projected image of the object 104b may be the appearance of a first reflection 110 on the first surface 102, and a second reflection 112 on a third surface 114, which may be a side of a cabinet 116. Similarly, as will be described in more detail below, under the present disclosure, properties of the third surface 114 is also analyzed, and the reflections 110 and 112 result taking into consideration these properties. Resultantly, user experience may be enhanced.

FIG. 1C shows an AR environment 100c where an image of the object 104c, the cartoon bear, is projected onto a surface 118, which may be a wall. As a result of the projection, a reflection 120 may appear on a fourth surface 122. Here, the image of the object 104c is saturated in a particular wavelength of light (for example green) to cause the resulting reflection 120 to appear more pronounced on the fourth surface 122 (based on a reflectivity analysis of the fourth surface 122). As will be described in more detail below, under the present disclosure, properties of fourth surface 122 is also analyzed, and the reflection 120 is projected taking into consideration these properties. Resultantly, user experience may be enhanced.

Figure 2:
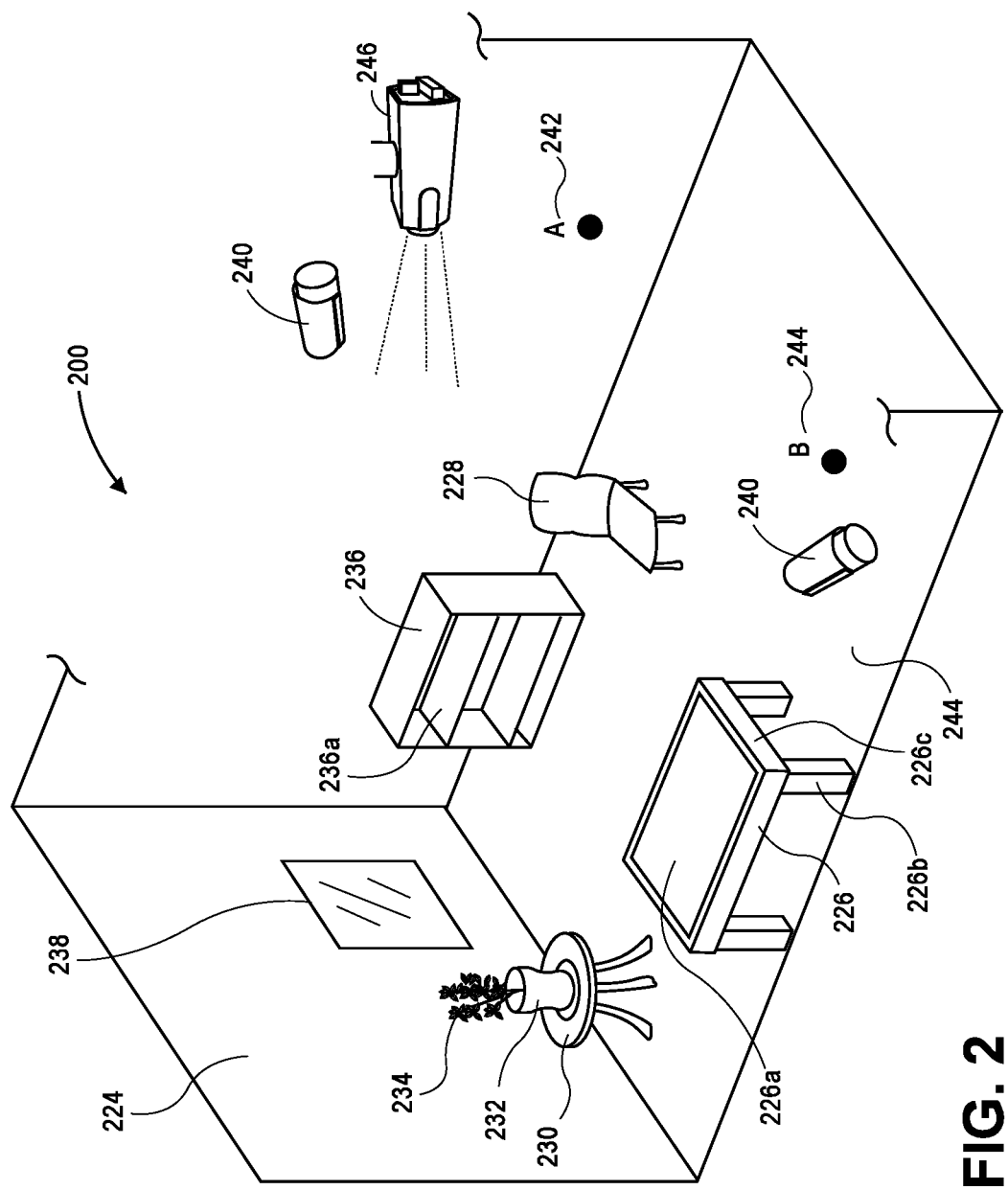
FIG. 2 is an example diagram of a mixed reality environment that includes sensors to determine visually reflective properties of physical surfaces, in accordance with various embodiments.

FIG. 2 is an example diagram of a mixed reality environment that includes sensors to determine visually reflective properties of physical surfaces, in accordance with various embodiments. An AR environment 200 includes multiple surfaces off of which a reflection may be viewed at any particular point of view within the AR environment 200. For examples, these surfaces may include walls such as wall 224, or surfaces of table 226 such as the tabletop 226a, table legs 226b, and table edge 226c. Reflective surfaces may further include the various surfaces of a chair 228, a small table 230 that may have a vase 232 sitting on top of it. The vase 232 may be a non-planar reflective surface that contain flowers 234 with features that may be reflective. Other surfaces may include those found on a bookshelf 236 that may contain multiple shelves 236a. Surfaces may also include mirrors 238 with a high degree of reflectivity.

The AR environment 200 includes various sensors, such as cameras 240 that may be positioned at various locations within the AR environment 200. In embodiments, the sensors may be positioned outside of the AR environment 200 but may be oriented such that they capture data about surfaces within the AR environment 200.

For example, sensors, such as cameras 240, may be positioned to capture surface reflective characteristics from a point of view at a location A, or at a location B, which may result in a very different reflective characteristics of the same physical surfaces as compared to location A.

In embodiments, the sensors may move around, for example on a track, or attached to a robot or a drone. The sensors may be associated with various light sources, such as projector 246, that may project an image (not shown, but may be similar to image of the object 104 of FIG. 1A, on a projection surface 106), and evaluate the reflections of the projected image that appear in the surfaces. In embodiments, the various light sources may vary in wavelength or intensity during the sensing process to identify characteristics of the reflective surface.

In embodiments, the sensors capture visible, infrared, and/or ultraviolet wavelength reflectivity from the physical surfaces. In addition, different types of reflectivity may depend upon ambient lighting present in the AR environment 200 and may have different characteristics like wavelength (color) and light intensity. This ambient lighting may be generated within the AR environment 200, or be received from outside the AR environment 200. Ambient lighting present in the AR environment 200 may also differ by time of day, type of weather (sunny or cloudy), day of the season, or other similar event that may affect ambient lighting in the AR environment 200.

In embodiments, the physical surface, for example table surface 226a, may be a glass, a Plexiglas ™, or some other transparent or partially transparent material that may cause a partial reflection off of the surface and a partial transmittal of the reflection through the surface that may strike another surface, for example the floor 244. In embodiments, the transmittal of the reflection through the transparent or partially transparent surface may cause the reflection to undergo refraction, or may result in a reflection to be a different color based upon the tint of the transparent or partially transparent surface.

In embodiments, data from the sensors used to identify and/or analyze physical surfaces within the AR environment 200 may be used to create one or more models that describe reflective characteristics of the physical surfaces. In embodiments, these models may include models from various points of view 242, 244 within the AR environment 200. In other embodiments, the models may include various contextual variables that may affect reflective properties, for example ambient light within the environment as described above. As will be described in more detail below, under the present disclosure, properties of selected ones or all of these surfaces are analyzed, and the reflection or reflections projected onto the surfaces take into consideration these properties. Resultantly, user experience may be enhanced.

Figure 3:
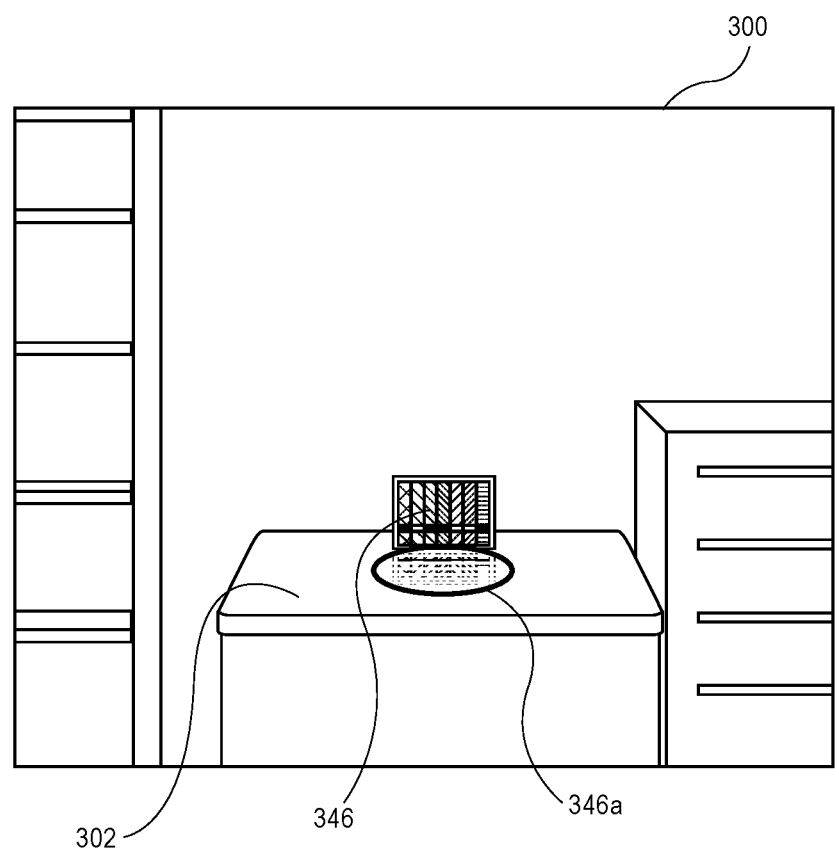
FIG. 3 is an example device to use to determine visually reflective properties of physical surfaces, in accordance with various embodiments.

FIG. 3 is an example device to use to determine visually reflective properties of physical surfaces, in accordance with various embodiments. AR environment 300, which may be similar to AR environment 100a-100c of FIGS. 1A-1C respectively, include surface 302, which may be similar to surface 102. In embodiments, a light generating device 346 is placed on the surface 302, and the resulting reflection 346a is used to identify reflecting characteristics of the surface 302. In embodiments, the light generating device 346 may include different wavelengths at different intensities that may be used to identify the reflective characteristics of surface 302 over a broad wavelength range.

In embodiments, the light generating device 346 may be positioned in other locations (not shown) within the AR environment 300. In embodiments, the light generating device 346 may be moved around by a drone or by a robot. After the light generating device 346 is placed, sensors, such as camera 240, may capture the resulting reflection 346a and use that data to update the AR reflection model.

Figure 4:
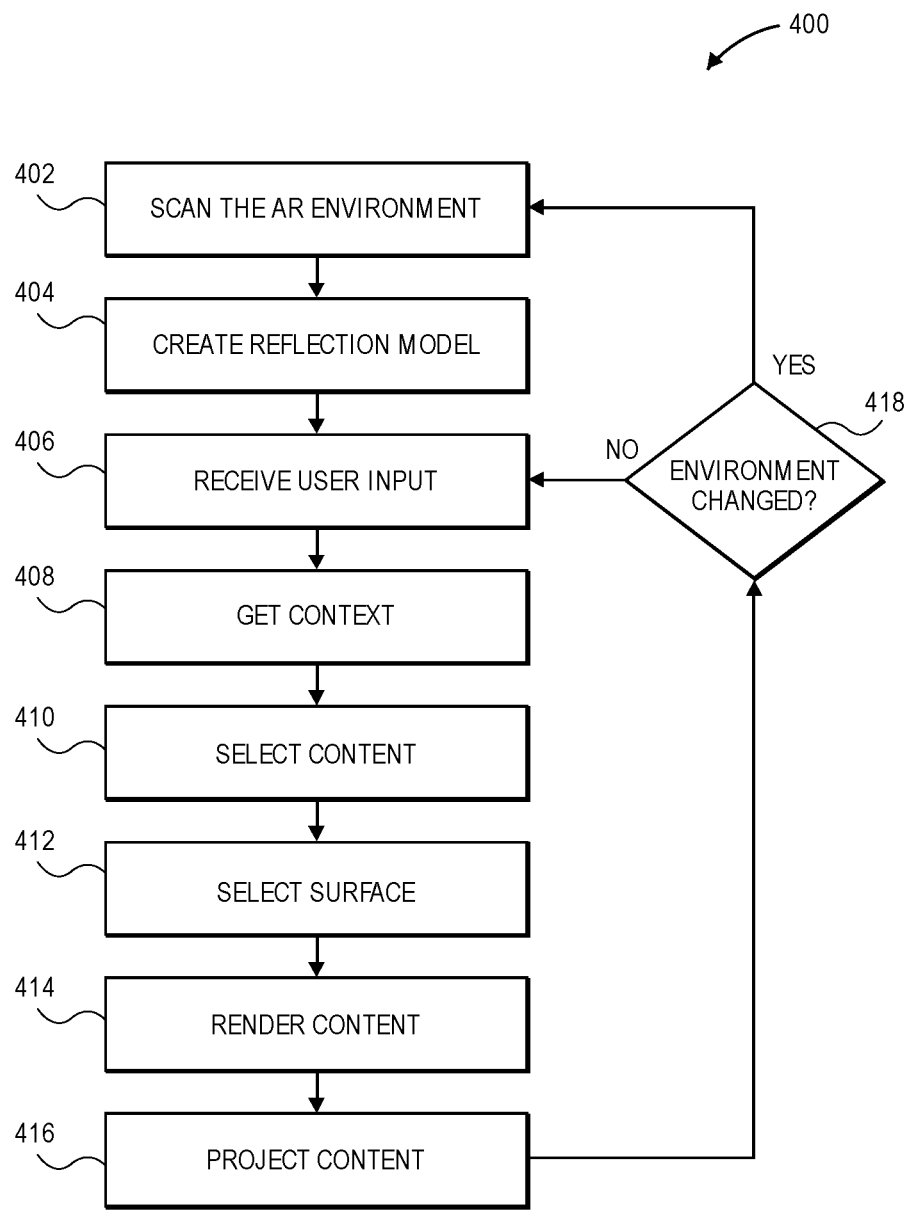
FIG. 4 illustrates an example overview process for determining visually reflective properties of physical surfaces and rendering content within a mixed reality environment, in accordance with various embodiments.

FIG. 4 illustrates an example process for determining visually reflective properties of physical surfaces and rendering content within a mixed reality environment, in accordance with various embodiments. Process 400 may be performed, in part, by a system 600 (e.g., a computing device) configured to determine visually reflective properties of physical surfaces in an AR environment as described in reference to FIGS. 1A-3.

At block 402, the AR environment is scanned. In embodiments, the cameras 240 and projectors 246 of FIG. 2 may be used to scan an AR environment, such as AR environment 200, to identify surfaces, such as surfaces 236, 226a, 238, 224, 230, 232, 234, 228 of FIG. 2. In embodiments, additional sensors may be used, for example RGB cameras, depth cameras, infrared (IR) sensors, optical sensors, sonic, laser, LIDAR, or electromagnetic-based sensors to collect positioning and/or reflection data the surfaces of various objects present in the room. In embodiments, the resulting data received from the sensors may be processed by a system, such a system 600, to identify the one or more surfaces that may produce a reflection, for example that may be produced as a result of an image projected upon the surface of the AR environment.

In addition to identifying one or more surfaces, the sensor data may be processed to identify features of the one or more surfaces, including, but not limited to, contours, smooth versus rough areas, and degrees of transparency. In embodiments, the scan may be conducted from various points of view within the AR environment 200.

In embodiments, the sensors, in conjunction with projectors such as projectors 246 and light generating devices such as light generating device 346 of FIG. 3, are used to cause various images to be projected upon various surfaces of the AR environment 200. Then, cameras 240 may be used to identify reflections off of other surfaces based upon the various projected images. In embodiments, projected images may vary in wavelength, intensity, and sharpness (e.g., a crisp image having fine lines versus blurred lines), which may provide additional information about the characteristics of the reflective surface. The resulting captured data may be used to determine various physical properties of surfaces, including reflective indices.

In embodiments, a scan of the AR environment 200 may occur at any time, or may occur frequently to provide an up-to-date evaluation of the one or more surfaces and their respective reflective characteristics based upon various images projected within the AR environment 200. For example, a scan may occur at different times of the day depending upon lighting conditions (e.g., an outside window allowing sunlight or other ambient light to enter the AR environment 200). Data from multiple scans may be subsequently used to create one or more comprehensive reflection models as discussed further below. A scan providing information about reflective properties of the one or more surfaces may include surfaces onto which an image may be projected (a projective surface), as well as surfaces adjacent to that projective surface.

In embodiments, the reflective index or other reflective characteristics of the surface could be created through a very fast trial and error procedure, with the system projecting an image (which may also be referred to as content), in various suitable places throughout the AR environment and measuring the lumens coming from the reflected images on the various surfaces. In another example, the reflected image could be detected by the system by projecting a specific test pattern (spatial and/or color), thus allowing easy detection of a warped/obscured reflection. Different versions of the content may be tested to determine optimum characteristics of reflections in the various surfaces.

At block 404, a reflection model is created. The data collected at block 402 are used to create a reflection model of the AR environment 200 that includes the one or more surfaces and their respective reflective properties (e.g., reflective indices) that re stored in a database. This data are used to create one or multiple reflection models that may incorporate various types of images projected on various surfaces within the AR environment, contextual information such as ambient lighting and other external characteristics affecting the AR environment, and reflective characteristics of the one or more surfaces. These various models reflect one or more different points of view (e.g., locations of a viewer) within the AR environment 200.

In embodiments, updated reflection models may be determined at any time, or on demand, by re-performing a scan of the AR environment and using the resulting information to update the reflection models. In embodiments, a reflection and analysis engine, which may be implemented as a part of module 650 of FIG. 6, may be based on, may use, or may interact with a generative adversarial network. Based upon data from multiple scans for the AR environment 200 using different image projections, the generative network may create different approaches and a discriminative network, e.g. a convolutional neural network (CNN) may evaluate the effect. In embodiments, the result of the learning may be used to alter the characteristics of a projected image, or where the images projected (to optimize reflections within the AR environment 200), and a subsequent scan may then be performed. This may be repeated, in some cases very rapidly, to converge on a particular set of desired characteristics for the reflections of the projected image.

The reflection model may have multiple uses. The reflection model may be used to recommend surfaces for content projection that may result in a desired reflection. It may also be used to suggest to the user possible changes in the content being projected to improve the resulting reflections by, for example, fully utilizing the reflective properties of the neighboring surfaces. In embodiments, these changes to the content may be automated.

Because the reflective properties of the material may depend on the viewing angle of the people in the AR environment 200, the same projection of content on a surface may create a different experience based on the position of people throughout the AR environment 200. However, for one person at one viewing point, a reflection model may be determined which could then be used to generate content fully utilizing the reflective properties optimized for that particular person and their point of view. Thus, in embodiments, the generated reflection model, the content provided by the user, positions of people in the room the projection content, and the surface on which the content is to be projected may be used to make the projected virtual object or character have a presence that is more realistic in the environment.

At block 406, user inputs are received. In embodiments, a user suggests an image (content) to project within the AR environment 200. In embodiments, a recommendation is made to a user to create/alter content based on the environment's reflective physical properties, rather than letting user figure out the best possible composition on his own. In such embodiments, the user may accept the recommendation, or this block may be skipped allowing the user to automatically accept the recommendation.

At block 408, a context is obtained. In embodiments, context includes data about the AR environment 200 that affect surface reflection. This data may include information about ambient lighting within the AR environment 200, which may include lighting external to the AR environment 200 that may enter the environment through a window or through some other opening. This data may also include information about other environmental factors, such as temperature, that may affect reflectivity of one or more surfaces within the AR environment 200. Selecting content to be projected may be based on the current context to maximize the effect of reflection from surfaces nearby the surface of projection.

At block 410, content is selected. In embodiments, a set of pieces of image-based content that are projected as a virtual object against a physical surface in the AR environment 200 are selected. In embodiments, a user may select the content to be displayed within the AR environment 200. In other embodiments, the selection may be provided by an outside system or process. In embodiments, the content may be a single image or a video image.

At block 412, the surface is selected. In embodiments, one of the one or more surfaces in the AR environment 200 are selected as a projection surface onto which the content (image) are to be projected. In embodiments, a user may select the surface. In other embodiments, a surface may be selected automatically based upon a desired reflection of the image upon one or more other surfaces based upon a point of view within the AR environment. For example, a surface may be selected as a projection surface of the image based upon the maximum number of reflections of the projected image that may be seen in other surfaces within the AR environment 200. In another example, a projection surface may be selected based upon the clearest reflection of the projected image that may appear in another surface within the AR environment 200.

At block 414, the process the content is rendered. In embodiments, the selected content (image) is modified so that the content projection on the selected surface provides the desired reflections on the other surfaces within the AR environment 200. In embodiments, aspects of the content may be modified based upon the reflection models described above and block 404. One example of modifying the selected content is to increase or decrease light intensity to increase or decrease reflectivity on other surfaces. Another example is to increase the saturation of a particular wavelength in the content to enhance the resulting reflection on some surfaces and not others, based upon the individual surface's reflective characteristics. Other characteristics of the content may be modified, for example the color, brightness, vibrancy, etc. of the image, in order to optimize one or more reflections on physical surfaces within the AR environment 200.

In embodiments, the content may be modified based upon lighting conditions and/or user positions within the AR environment 200. In addition, as part of the rendering process, ambient light adjustments may be made through, for example, internet of things (IoT) control of lights and shades within the AR environment 200.

At block 416, the content is projected. In embodiments, projector 246 of FIG. 2 is used to project the rendered content onto the selected surface in the AR environment 200. In embodiments, there may be multiple projectors 246. In other embodiments, the projectors 246 may be movable, for example on tracks, swivels, robots, or drones.

At block 418, a determination is made on whether the environment has changed. In embodiments, the AR environment 200 is regularly scanned to identify changes. In addition, to reduce the un-necessary computing and power requirements, a low power scanning technique can be implemented to detect changes in the environment. These changes may include, but are not limited to, changes in lighting condition, arrangement of the surfaces, movement of people within the environment, etc. In some embodiments, any detected physical change in the AR environment 200 may immediately cause the AR environment 200 to be rescanned in the reflection model updated in real-time.

If a change in the physical aspects in the AR environment are detected, then the process 400 is reverted to block 402, where the AR environment is scanned using some or all of the sensors as referred to in FIG. 2., and subsequently the reflection model is updated in block 404.

If no change in the physical aspects in the AR environment are detected, then the process 400 may revert to block 406 where further user input is received. In other embodiments, the process 400 may revert to some other block shown and described in FIG. 4.

Figure 5:
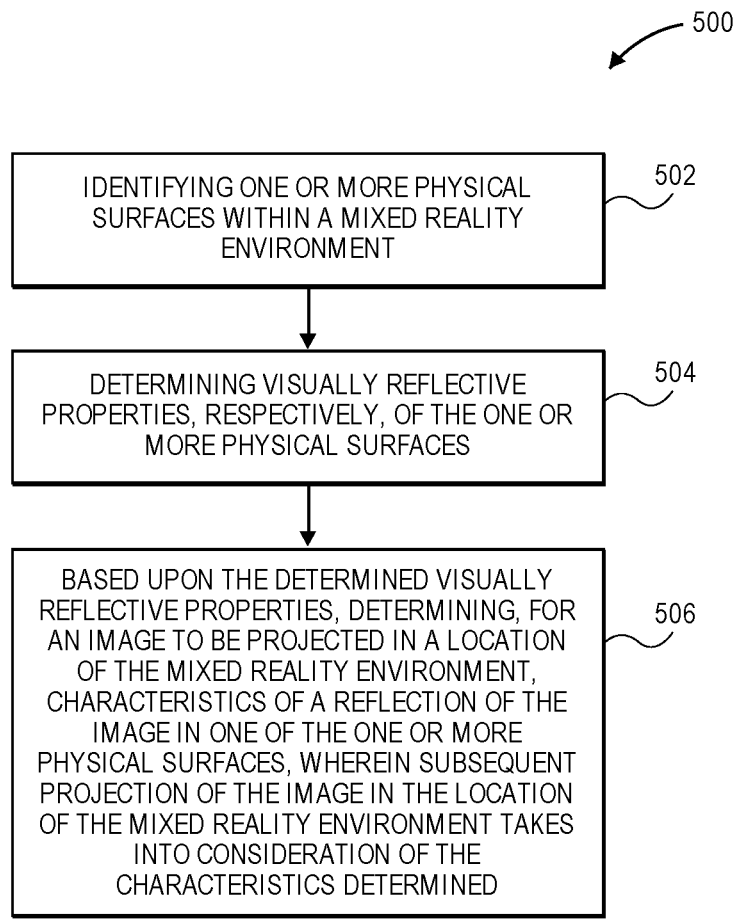
FIG. 5 illustrates an example process for determining visually reflective properties of physical surfaces within a mixed reality environment, in accordance with various embodiments.

FIG. 5 illustrates an example process for determining visually reflective properties of physical surfaces within a mixed reality environment, in accordance with various embodiments. The process 500 may be performed, for example, by a system 600 (e.g., computing device) configured to implement a mixed reality or AR system as described in reference to FIGS. 1-4.

The process begins at block 502 and includes identifying one or more physical surfaces within a mixed reality environment. In embodiments, as referred to above, sensors such sensors 240 of FIG. 2 are used to scan an AR environment 200 to identify one or more physical surfaces such as surfaces 236, 226*a*, 238, 224, 230, 232, 234, 228.

At block 504 the process includes determining visually reflective properties, respectively, of the one or more physical surfaces. In embodiments, as referred to above, the sensors 240, in conjunction with projectors such as projector 246, and with light measuring device 346, are used to determine visually reflective properties of the one or more surfaces based upon various images projected on one of the one or more surfaces. In embodiments, determining visually reflective properties are done in an automated fashion through a series of assessments, using different images, different image projection surfaces, and different points of view within the AR environment 200 from which the sensors 240 record information.

As described above, a collection of these visually reflective properties of the one or more physical surfaces are stored in a database or stored as one or more models that may be gathered within a neural network or other data repository.

At block 506, the process include, based upon the determined visually reflective properties, determining, for an image to be projected in a location of the mixed reality environment, characteristics of a reflection of the image in one of the one or more physical surfaces, wherein subsequent projection of the image in the location of the mixed reality environment takes into consideration of the characteristics determined. In embodiments, an image, for example image of an object 104 of FIG. 1A, is analyzed, using a reflection analysis module such as module 650 of FIG. 6, based on the image being projected on one of the surfaces, for example surface 106.

The reflection analysis module takes into account characteristics of the image of an object 104 in addition to the determined visually reflective properties of the one or more physical surfaces. The result may be a description or a predictive rendering of one or more reflections of the image in various surfaces of the AR environment 200. The description or predictive rendering, for example, of the one or more reflections may be used to modify the image to be projected in order to modify the resulting reflections.

Figure 6:
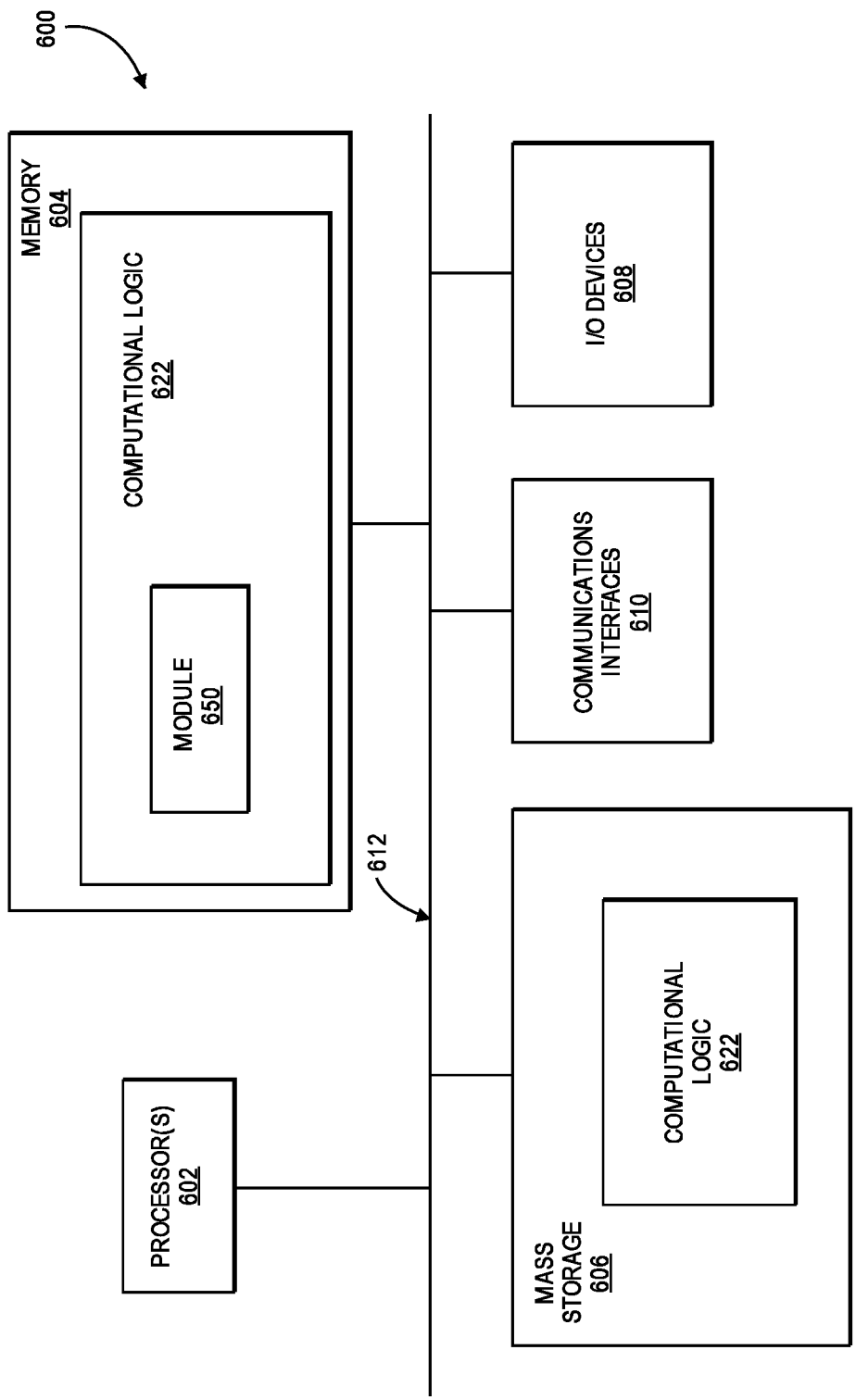
FIG. 6 illustrates an example computing device suitable for use to practice aspects of the present disclosure, in accordance with various embodiments.

FIG. 6 illustrates an example computing device suitable for use to practice aspects of the present disclosure, in accordance with various embodiments. For example, the example computing device 600 may be suitable to implement the functionalities associated with FIGS. 1A-5.

As shown, computing device 600 includes one or more processors 602, each having one or more processor cores, and system memory 604. In embodiments, the one or more processors may be referred to as processor circuitry. The processor 602 may include any type of unicore or multi-core processors. Each processor core may include a central processing unit (CPU), and one or more level of caches. The processor 602 is implemented as an integrated circuit. The computing device 600 may include mass storage devices 606 (such as diskette, hard drive, volatile memory (e.g., dynamic random access memory (DRAM)), compact disc read only memory (CD-ROM), digital versatile disk (DVD) and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 600 may further include input/output (I/O) devices 608 such as a display, keyboard, cursor control, remote control, gaming controller, image capture device, or one or more cameras or one or more projectors, and so forth, and communication interfaces 610 (such as network interface cards, modems, infrared receivers, radio receivers (e.g., Bluetooth), and so forth). I/O devices 608 may be suitable for communicative connections with sensors and/or projectors associated with AR systems, other mixed reality systems, neural networks, and the like. In some embodiments, I/O devices 608 when used as user devices may include a device necessary for identifying characteristics of reflections of images in AR environment surfaces in relation to FIGS. 1A-5.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations and functionalities associated with some of the components of FIGS. 1A-5. and so forth, generally shown as computational logic 622. Computational logic 622 may be implemented by assembler instructions supported by processor(s) 602 or high-level languages that may be compiled into such instructions.

System memory 604 and/or mass storage devices 606, may also include data such as data associating various images to be projected in an AR environment with contexts of the AR environment and with characteristics of reflective surfaces within the AR environment with respect to FIGS. 1A-5.

The computational logic 622 may contain one or more modules 650, which may perform one or more functions associated with FIGS. 1A-5. In embodiments, when implementing a reflection and analysis module, module 650 may perform one or more of the functions associated with process 400 of FIG. 4 or process 500 of FIG. 5.

The permanent copy of the programming instructions may be placed into mass storage devices 606 in the factory, or in the field, though, for example, a distribution medium (not shown), such as a compact disc (CD), or through communication interfaces 610 (from a distribution server (not shown)).

Figure 7:
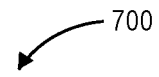
FIG. 7 illustrates an example non-transitory computer-readable storage medium having instructions configured to practice all or selected ones of the operations associated with the processes described herein.

FIG. 7 illustrates an example non-transitory computer-readable storage medium having instructions configured to practice all or selected ones of the operations associated with the processes described herein. As illustrated, non-transitory computer-readable storage medium 702 may include a number of programming instructions 704 (e.g., including a controller module and logic blocks). Programming instructions 704 may be configured to enable a device, e.g. computing device 700, in response to execution of the programming instructions, to perform one or more operations of the processes described in reference to FIGS. 1A-5. In alternate embodiments, programming instructions 704 may be disposed on multiple non-transitory computer-readable storage media 702 instead. In still other embodiments, programming instructions 704 may be encoded in transitory computer-readable signals.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 is one or more computer-readable media comprising instructions that cause a computer device, in response to execution of the instructions by one or more processors of the computer device, to operate a reflection analysis engine to: identify one or more physical surfaces within a mixed reality environment; determine visually reflective properties, respectively, of the one or more physical surfaces; and based upon the determined visually reflective properties, determine, for an image to be projected in a location of the mixed reality environment, characteristics of a reflection of the image in one of the one or more physical surfaces; wherein subsequent projection of the image in the location of the mixed reality environment takes into consideration of the characteristics determined.

Example 2 is the one or more computer-readable media of example 1, the computer device is further caused to receive data from one or more sensors located within or proximate to the mixed reality environment.

Example 3 is one or more computer readable media of example 1, wherein to determine visually reflective properties of the one or more physical surfaces further includes to determine visually reflective properties of the one or more physical surfaces from a point of view of one or more viewing locations within the mixed reality environment.

Example 4 is the one or more computer-readable media of example 1, wherein to determine characteristics of a reflection of the image in the one of the one or more physical surfaces further includes to produce a sample reflection of the image to be reviewed by a user.

Example 5 is the one or more computer-readable media of example 1, wherein to determine characteristics of the reflection of the projected image in the one of the one or more physical surfaces further includes to identify alterations to the image to change reflective characteristics of the image in the one of the one or more physical surfaces.

Example 6 is the one or more computer-readable media of example 1, wherein to determine characteristics of a reflection of the image in the one of the one or more physical surfaces further includes to identify a change in the location of the mixed reality environment at which the image is to be projected to alter the reflective characteristics of the image in the one of the one or more physical surfaces.

Example 7 is the one or more computer-readable media of example 1, wherein at least one of the one or more physical surfaces are non-planar.

Example 8 is the one or more computer-readable media of any one of examples 1-7, wherein the location of the image to be projected within the mixed reality environment is on one or more of the physical surfaces within the mixed reality environment.

Example 9 is an apparatus to analyze reflections of physical surfaces within a mixed reality environment, the apparatus comprising: one or more computer processors; a reflection analysis module communicatively coupled to the one or more processors to: identify one or more physical surfaces within a mixed reality environment; determine visually reflective properties, respectively, of the one or more physical surfaces; based upon the determined visually reflective properties, determine, for an image to be projected in a location of the mixed reality environment, characteristics of a reflection of the image in one of the one or more physical surfaces; and wherein subsequent projection of the image in the location of the mixed reality environment takes into consideration of the characteristics determined.

Example 10 is the apparatus of example 9, wherein the module is to receive data from one or more sensors located within or proximate to the mixed reality environment.

Example 11 is the apparatus of example 10, wherein the apparatus includes the one or more sensors.

Example 12 is the apparatus of example 9, wherein to determine visually reflective properties of the one or more physical surfaces further includes to determine visually reflective properties of the one or more physical surfaces from a point of view of one or more viewing locations within the mixed reality environment.

Example 13 is the apparatus of example 9, wherein to determine characteristics of a reflection of the image in the one of the one or more physical surfaces further includes to produce a sample reflection of the image to be reviewed by a user.

Example 14 is the apparatus of example 9, wherein to determine characteristics of the reflection of the projected image in the one of the one or more physical surfaces further includes to identify alterations to the image to change reflective characteristics of the image in the one of the one or more physical surfaces.

Example 15 is the apparatus of example 9, wherein to determine characteristics of a reflection of the image in the one of the one or more physical surfaces further includes to identify a change in the location of the mixed reality environment at which the image is to be projected to alter the reflective characteristics of the image in the one of the one or more physical surfaces.

Example 16 is the apparatus of example 9, wherein at least one of the one or more physical surfaces are non-planar.

Example 17 is the apparatus of any one of examples 9-16, wherein the location of the image to be projected within the mixed reality environment is on one or more of the physical surfaces within the mixed reality environment.

Example 18 is a computer-based method comprising: identifying one or more physical surfaces within a mixed reality environment; determining visually reflective properties, respectively, of the one or more physical surfaces; and based upon the determined visually reflective properties, determining, for an image to be projected in a location of the mixed reality environment, characteristics of a reflection of the image in one of the one or more physical surfaces; wherein subsequent projection of the image in the location of the mixed reality environment takes into consideration of the characteristics determined.

Example 19 is the computer-based method of example 18, further comprising receiving data from one or more sensors located within or proximate to the mixed reality environment.

Example 20 is the computer-based method of example 18, wherein determining visually reflective properties of the one or more physical surfaces further includes determining visually reflective properties of the one or more physical surfaces from a point of view of one or more viewing locations within the mixed reality environment.

Example 21 is the computer-based method of example 18, wherein determining characteristics of a reflection of the image in the one of the one or more physical surfaces further includes producing a sample reflection of the image to be reviewed by a user.

Example 22 is the computer-based method of example 18, wherein determining characteristics of the reflection of the projected image in the one of the one or more physical surfaces further includes identifying alterations to the image to change reflective characteristics of the image in the one of the one or more physical surfaces.

Example 23 is the method of example 18, wherein to determine characteristics of a reflection of the image in the one of the one or more physical surfaces further includes to identify a change in the location of the mixed reality environment at which the image is to be projected to alter the reflective characteristics of the image in the one of the one or more physical surfaces.

Example 24 is the computer-based method of example 18, wherein at least one of the one or more physical surfaces are non-planar.

Example 25 is the computer-based method of any one of examples 18-24, wherein the location of the image to be projected within the mixed reality environment is on one or more of the physical surfaces within the mixed reality environment.

What is claimed is:

1. One or more non-transitory computer-readable storage media comprising instructions that cause a computer device, in response to execution of the instructions by one or more processors of the computer device, to operate a reflection analysis engine to:
   identify one or more physical surfaces within a mixed-reality environment from one or more points of view within the mixed-reality environment;
   determine visually reflective properties, respectively, of the one or more physical surfaces;
   determine a model that describes reflective characteristics of the one or more physical surfaces based upon the determined visually reflective properties; and
   based upon the model, determine, for an image to be subsequently projected directly into a physical location of the mixed-reality environment using one or more projectors in a physical environment of the mixed-reality environment, characteristics of a reflection of the image in one of the one or more physical surfaces, wherein subsequent projection of the image in the physical location of the mixed-reality environment that results in a reflection of the image in the one or more physical surfaces takes into consideration the characteristics determined.

2. The one or more non-transitory computer-readable storage media of claim 1, wherein to determine the visually reflective properties of the one or more physical surfaces further includes to determine the visually reflective properties of the one or more physical surfaces from a point of view of one or more viewing locations within the mixed-reality environment.

3. The one or more non-transitory computer-readable storage media of claim 1, wherein to determine the characteristics of the reflection of the image in the one of the one or more physical surfaces further includes to produce a sample reflection of the image to be reviewed by a user.

4. The one or more non-transitory computer-readable storage media of claim 1, wherein to determine the characteristics of the reflection of the projected image in the one of the one or more physical surfaces further includes to identify alterations to the image to change the reflective characteristics of the image in the one of the one or more physical surfaces.

5. The one or more non-transitory computer-readable storage media of claim 1, wherein to determine the characteristics of the reflection of the image in the one of the one or more physical surfaces further includes to identify a change in the location of the mixed-reality environment at which the image is to be projected to alter the reflective characteristics of the image in the one of the one or more physical surfaces.

6. The one or more non-transitory computer-readable storage media of claim 1, wherein the computer device is further caused to project the image into the physical location of the mixed-reality environment using the one or more projectors in the physical environment.

7. The one or more non-transitory computer-readable storage media of claim 1, wherein the computer device is further caused to modify the image based upon the characteristics of the reflection of the image in the one of the one or more physical surfaces to enhance a reflection on at least one of the one or more physical surfaces.

8. The one or more non-transitory computer-readable storage media of claim 7, wherein to modify the image further includes a selected one or more of: to increase or decrease light intensity of the image, to increase a saturation of a wavelength or range of wavelengths in the image, or to modify a color of the image.

9. An apparatus to analyze reflections of physical surfaces within a mixed-reality environment, the apparatus comprising:
   one or more computer processors;
   a reflection analysis module communicatively coupled to the one or more processors to:
      identify one or more physical surfaces within a mixed-reality environment from one or more points of view within the mixed-reality environment;
      determine visually reflective properties, respectively, of the one or more physical surfaces;
      determine a model that describes reflective characteristics of the one or more physical surfaces based upon the determined visually reflective properties;
      based upon the model, determine, for an image to be projected directly into a physical location of the mixed-reality environment using one or more projectors in a physical environment of the mixed-reality environment, characteristics of a reflection of the image in one of the one or more physical surfaces; and
      wherein subsequent projection of the image in the location of the mixed
         reality environment that results in a reflection of the image in the one or more physical surfaces takes into consideration the characteristics determined.

10. The apparatus of claim 9, wherein to determine the visually reflective properties of the one or more physical surfaces further includes to determine the visually reflective properties of the one or more physical surfaces from a point of view of one or more viewing locations within the mixed-reality environment.

11. The apparatus of claim 9, wherein to determine the characteristics of the reflection of the image in the one of the one or more physical surfaces further includes to produce a sample reflection of the image to be reviewed by a user.

12. The apparatus of claim 9, wherein to determine the characteristics of the reflection of the projected image in the one of the one or more physical surfaces further includes to identify alterations to the image to change the reflective characteristics of the image in the one of the one or more physical surfaces.

13. The apparatus of claim 9, wherein to determine the characteristics of the reflection of the image in the one of the one or more physical surfaces further includes to identify a change in the location of the mixed-reality environment at which the image is to be projected to alter the reflective characteristics of the image in the one of the one or more physical surfaces.

14. The apparatus of claim 9, wherein the location of the image to be projected within the mixed-reality environment is on one or more physical surfaces within the mixed-reality environment.

15. The apparatus of claim 9, further comprising the one or more projectors in the physical environment, the one or more projectors coupled to the one or more processors; and
   wherein the apparatus projects the image into the physical location of the mixed-reality environment using the one or more projectors in the physical environment.

16. The apparatus of claim 9, wherein the reflection analysis module is further to modify the image based upon the characteristics of the reflection of the image in one of the one or more physical surfaces to enhance a reflection on at least one of the one or more physical surfaces.

17. The apparatus of claim 16, wherein to modify the image further includes a selected one or more of: to increase or decrease light intensity of the image, to increase a saturation of a wavelength or range of wavelengths in the image, or to modify a color of the image.

18. A computer-based method comprising:
   identifying one or more physical surfaces within a mixed-reality environment from one or more points of view within the mixed-reality environment;
   determining visually reflective properties, respectively, of the one or more physical surfaces;
   determining a model that describes reflective characteristics of the one or more physical surfaces based upon the determined visually reflective properties;
   based upon the model, determining, for an image to be projected directly into a physical location of the mixed-reality environment, characteristics of a reflection of the image in one of the one or more physical surfaces; and
   wherein subsequent projection of the image in the location of the mixed-reality environment that results in a reflection of the image in the one or more physical surfaces takes into consideration the characteristics determined.

19. The computer-based method of claim 18, wherein determining the visually reflective properties of the one or more physical surfaces further includes determining the visually reflective properties of the one or more physical surfaces from a point of view of one or more viewing locations within the mixed-reality environment.

20. The computer-based method of claim 18, wherein determining the characteristics of the reflection of the image in the one of the one or more physical surfaces further includes producing a sample reflection of the image to be reviewed by a user.

21. The computer-based method of claim 18, wherein determining the characteristics of the reflection of the projected image in the one of the one or more physical surfaces further includes identifying alterations to the image to change the reflective characteristics of the image in the one of the one or more physical surfaces.

22. The computer-based method of claim 18, wherein determining the characteristics of the reflection of the image in the one of the one or more physical surfaces further includes identifying a change in the location of the mixed-reality environment at which the image is to be projected to alter the reflective characteristics of the image in the one of the one or more physical surfaces.

23. The computer-based method of claim 18, wherein at least one of the one or more physical surfaces are non-planar.

24. The computer-based method of claim 18, wherein the location of the image to be projected within the mixed-reality environment is on one or more of the physical surfaces within the mixed-reality environment.

25. The computer-based method of claim 18, further comprising projecting the image into the physical location of the mixed-reality environment.

* * * * *